United States Patent

[11] 3,587,626

| [72] | Inventors | William E. Cowley;<br>Wilfred M. McCord, Jr., Louisville, Ky. |
|---|---|---|
| [21] | Appl. No. | 854,995 |
| [22] | Filed | Sept. 3, 1969 |
| [45] | Patented | June 28, 1971 |
| [73] | Assignee | Vermont American Corporation<br>Louisville, Ky. |

[54] TRANSPORTABLE HOSE REEL
9 Claims, 7 Drawing Figs.

[52] U.S. Cl. ................................................. 137/355.12,
                                                          137/355.27
[51] Int. Cl. ...................................................... B65h 75/34
[50] Field of Search............................................ 137/355.12

[56] References Cited
UNITED STATES PATENTS

| 2,096,225 | 10/1937 | Crawford | 137/355.12X |
| 2,490,353 | 12/1949 | Hannay | 137/355.27 |
| 2,571,012 | 10/1951 | Coats | 137/355.27 |
| 1,255,854 | 2/1918 | Boss | 137/355.12 |

*Primary Examiner* — Henry T. Klinksiek
*Attorney* — Johnson, Dienner, Emrich, Verbeck & Wagner ABSTRACT: A transportable hose reel constructed to store and transport a garden hose wrapped around a cylindrical drum having circular flanges secured to its opposite ends, which serve as wheels, and a hollow tubular axle disposed along the drum's cylindrical axis and extending beyond the two flanges a short distance. The ends of the axles are rotatably mounted in aligned openings provided in a hose reel frame structure at the connection of two U-shaped tubular frame members which are joined together in a 90° angle relationship at the outer extremities of their two arm portions. A short length of pipe is mounted on the frame adjacent to one end of the axle such that one of its ends projects axially into the tubular axle and carries two O-rings which provide a revolvable seal. A discharge conduit extends between the axle and the periphery of the drum to provide a connection to one end of the garden hose wrapped around the drum.

PATENTED JUN 28 1971

Inventors:
William E. Cowley,
Wilfred M. McCord, Jr.
By Brown, Jackson
Boettcher & Dienner
Attys.

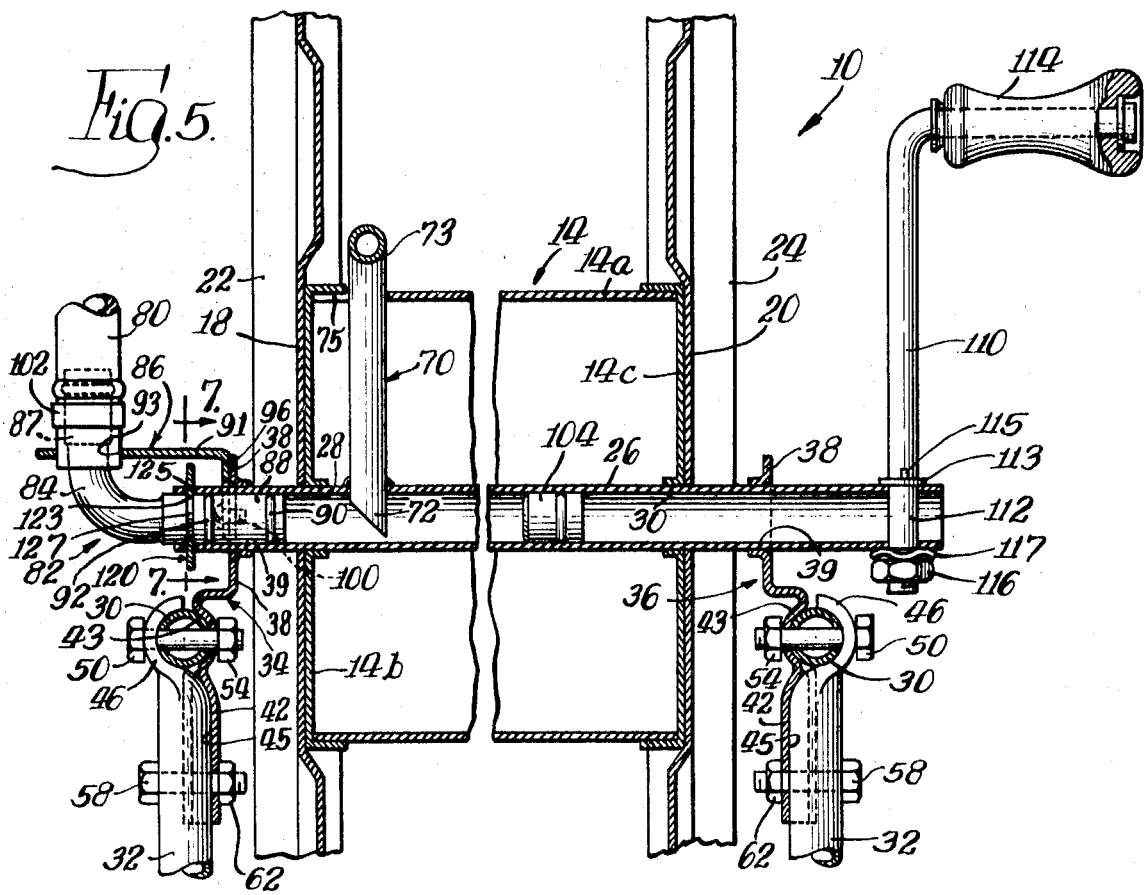
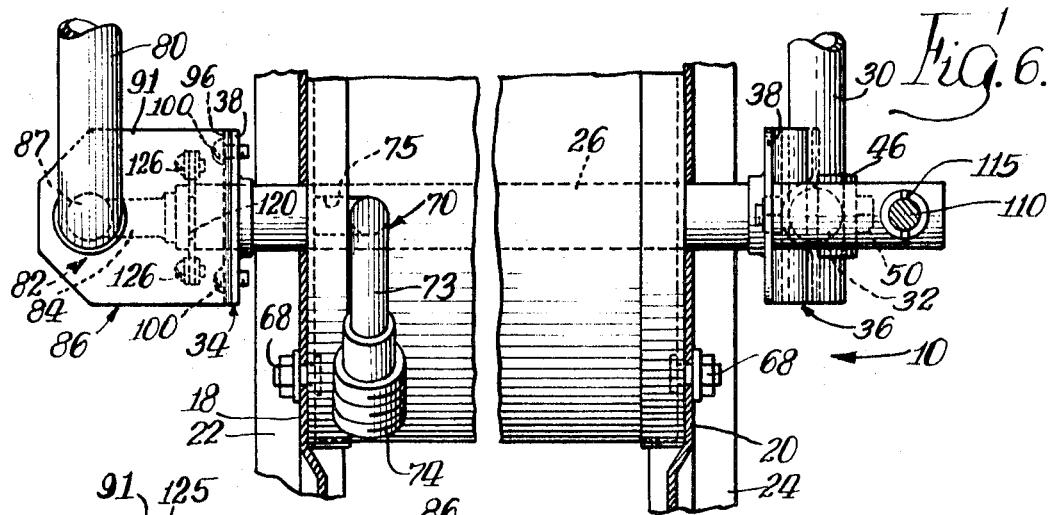
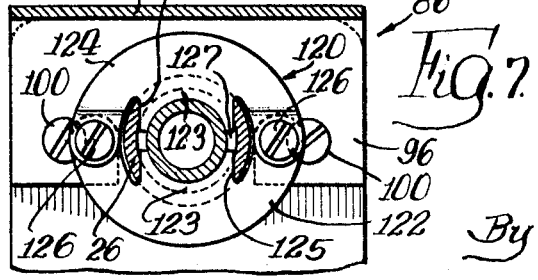
Inventors:
William E. Cowley,
Wilfred M. McCord, Jr.

TRANSPORTABLE HOSE REEL

This invention relates to a hose reel, and more particularly, to a transportable hose reel.

One of the most important features today for a commercially acceptable hose reel is the ability to wind or unwind a garden hose partially from the hose reel without the necessity of disconnecting it from the water faucet. This feature is made possible by using a rotatable conduit means in the shaft of the reel to provide a revolvable connection between the hose section extending from the water faucet and the garden hose wrapped around the reel. Some of the hose reels having this feature are constructed so that they may be permanently mounted on the wall adjacent to the faucet. To permit the unit to be transported and stored away from the water faucet, others are adapted to be mounted on a truck. In addition to the cost consideration, the use of a truck has been found to be objectionable because it provides a very unstable foundation or base when the garden hose is being unwound or wound onto the reel.

Because it is common practice to package such items as hose reels in an unassembled condition, another design consideration in constructing a hose reel unit is to have as few as possible components to be assembled by a mechanically unskilled purchaser in a reasonable period of time.

Accordingly, one of the objects of this invention is to provide a transportable hose reel having a revolvable conduit means in the shaft of the reel to provide a connection between a hose section extending from a water faucet and the garden hose wrapped around the reel, which is inexpensive to manufacture and is very stable during the unwinding and winding of the hose on the reel.

Another object of this invention is to provide a transportable hose reel having a revolvable conduit means in the shaft of the reel to connect a hose section extending from a water faucet to the garden hose wrapped around the reel which is unique but simple in construction having relatively few major components which can be easily assembled together.

Another object of this invention is to provide a transportable hose reel having a cylindrical drum for carrying the garden hose with circular flanges at its opposite ends that serve as wheels for the hose reel, and a hollow tubular axle for the drum which serves as a conduit from a stationary fitting on the hose reel frame work to a fitting carried by and rotatable with the drum, said latter fitting extending between the axle and the garden hose wrapped around the drum.

Further objects and advantages of the invention and other new and useful features in the construction, arrangement and general combination of parts will be readily apparent as the following proceeds with reference to the accompanying drawings, in which like reference characters designate like parts throughout, and in which:

FIG. 5 is a sectional view taken along the lines 5-5 of FIG. 3;

FIG. 6 is a partial top plan view of the embodiment shown in FIG. 5; and

FIG. 7 is a sectional view taken along the lines 7-7 of the embodiment shown in FIG. 5.

Figure 1:
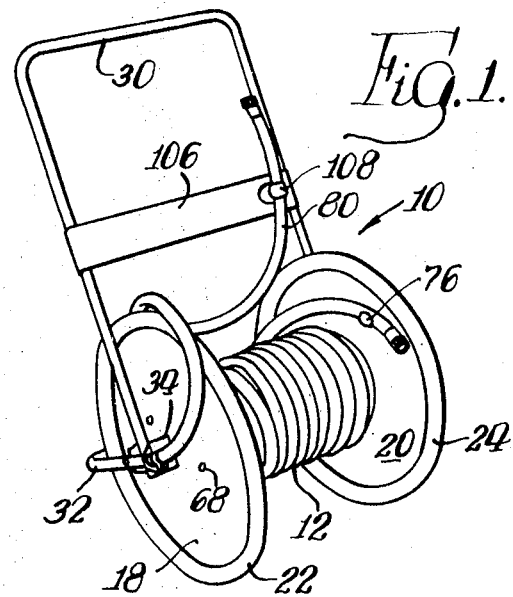
FIG. 1 is a perspective view of a garden hose reel unit embodying the principles of the invention.

Referring now to the drawings, there is shown in FIG. 1 an embodiment of this invention in transportable hose reel, generally designated by the reference numeral 10, and illustrated with a conventional garden hose, generally designated by the reference numeral 12, wound around the drum 14 (see FIGS. 3, 4 and 5) of the hose reel. Secured to the opposite ends of the cylindrical drum 14 are circular flange members 18 and 20. In addition to holding the garden hose 12 within the confines of the drum 14, the flanges 18 and 20 serve as wheels for the hose reel unit 10, and for this reason have rubber tires 22 and 24, respectively, disposed around their outer periphery. As shown in FIG. 5, a hollow tubular axle member 26 is positioned along the center axis of the drum 14 and extends through openings 28 and 30 in the opposite end walls 14b and 14c of the drum 14. The manner in which it is drivingly connected with the drum will be described below.

The frame for the hose reel unit 10 consists of two U-shaped tubular members, a handle member 30 and a bottom rest member 32. To rigidly couple the ends of the two arm portions of handle member 30 and of bottom rest member 32 together in a spaced apart, approximately 90° relationship, two axle brackets 34 and 36 are employed. Each axle bracket 34 and 36 is identical in shape and construction having a plate portion 38 (FIG. 5), with a circular opening 39 provided therein to fit over the ends of the axle 26 (see FIG. 5) and a securing portion 42, with a channel 43 conforming to a portion of the cross-sectional shape of handle member 30, and a channel 45 conforming to a portion of the cross sectional shape of rest member 32. The outer ends of bottom rest member 32 have an arcuate shape, as at 46, which, together with the channel 43 of the securing portion 42 of the axle brackets 34 and 36, respectively, wrap around the free ends of handle member 30 when handle 30 is disposed at a 90° angle relative to bottom rest member 32.

To secure the handle member 30 in this 90° locked relationship with respect to the bottom rest member 32, aligned openings are provided in the arcuate flange portions 46 at the outer ends of bottom rest member 32, in the securing portions 42 of angle brackets 34 and 36, respectively and the free ends of handle member 30, and bolts 50 are inserted through these aligned openings and secured in place by tightening nuts 54 on their threaded ends. Also, at outer ends of securing portions 42 of the axle brackets 34 and 36, respectively, are openings aligned with openings through the ends of the bottom rest member 32. Through those aligned openings bolts 58 are inserted and the bolts are fastened in place by means of nuts 62 on their threaded ends.

Figure 3:
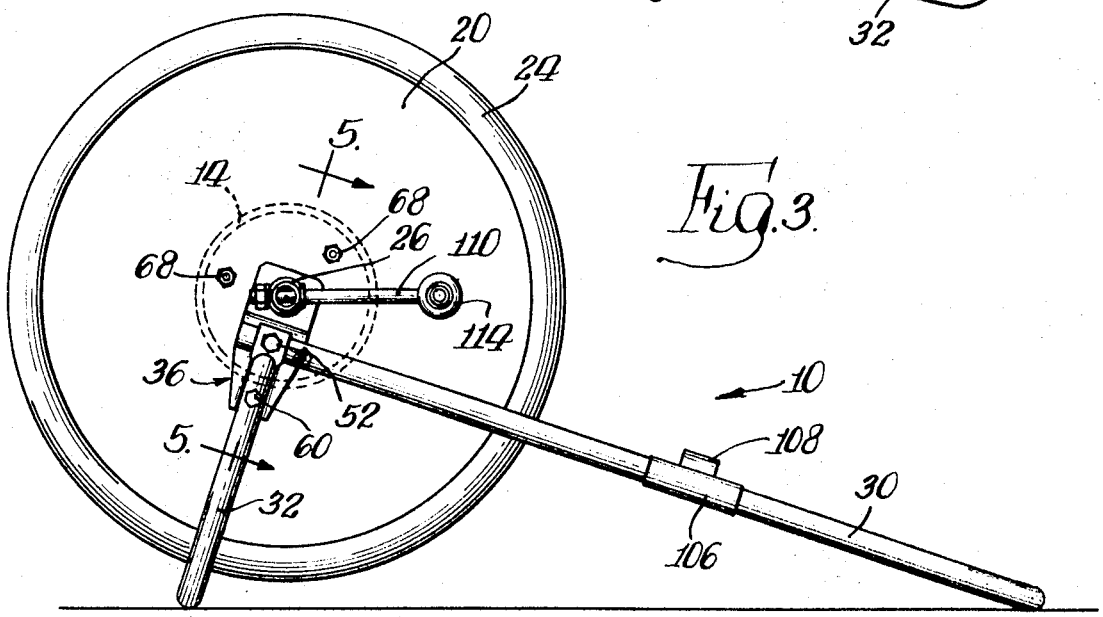
FIG. 3 is a side elevational view of the embodiment depicted in FIG. 2.

To make the overall weight of the hose unit 10 as light as possible, the drum 14 is constructed of a lightweight metal material in the form of a hollow cylinder 14a with the end walls 14b and 14c. The end walls are spot welded or otherwise secured to the cylindrical portion 14a of drum 14. The flange members 18 and 20 are secured to opposite end walls 14b and 14c of the drum 14 by means of three angularly spaced bolt and nut sets, which are generally designated by the reference numeral 68 (FIGS. 3 and 6). To provide a fluid passageway from the hollow tubular axle member 26 to the garden hose 12 which is wrapped around the drum 14, a discharge conduit 70 is provided. Conduit 70 has one end 72 projecting into the inner area of the axle member 26 and sealingly connected with it and has the other end 73 extending out of an opening 75 (FIG. 5) provided in the peripheral sidewall 14a of drum 14 and bent through a 90° angle to terminate in a close spatial relationship to the surface of drum 14. A male hose fitting 74 is on the end 73 of discharge conduit 70, and conduit 70 rotates with the turning of the drum 14. To keep the end of the garden hose 12 having the male fitting from becoming unraveled when the garden hose unit 10 is being transported, one or more spring clips, such as spring clip member 76 (see FIG. 1), are provided on the inside surface of flange member 20.

The opening 75 is a slot extending from the left edge (FIG. 5) of the cylindrical wall 14a of the drum. Its width is great enough to closely accommodate the diameter of the discharge conduit 70. The length of the slot 75 is such that when the end wall 14b is secured in place on the cylindrical wall 14a of the drum, the conduit 70 is encompassed and it thereby serves to form a driving connection to cause the drum to be rotated when the handle 110 is manipulated. By reason of this construction it is unnecessary to weld the axle 26 to the drum 14.

To interconnect the hose section 80 to the revolvable tubular axle 26, a novel swivel assembly, generally designated by the reference numeral 82 (see FIG. 5), is provided comprising a seal pipe 83 and an L-shaped bracket 86. The seal pipe 84 is a short length of metal pipe having a 90° bend with one end 87 being inserted into the end of hose section 80 and the other end 88 inserted into one of the ends of axle 26. The end 88 has two spaced apart annular grooves formed around its periphery into which two O-rings 90 and 92 are seated to provide a seal between the end 88 of seal pipe 84 and the tubular axle 26. A sealing plug 104 is inserted into the end of tubular axle member 26 opposite to the seal pipe 84 to prevent loss of water from that end.

Figure 4:
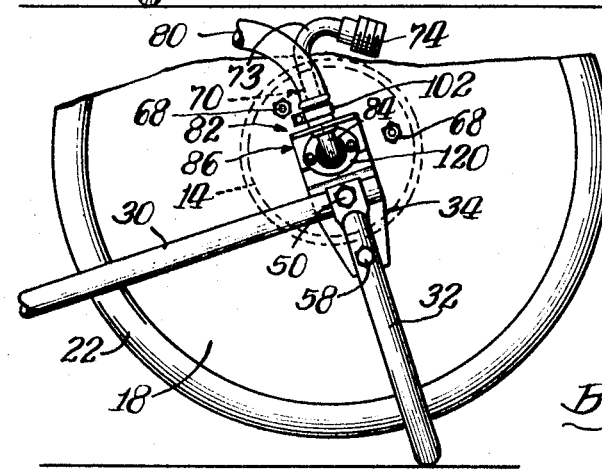
FIG. 4 is a partially broken away side elevational view of the left side of the embodiment depicted in FIG. 2.

The L-shaped bracket 86 assists in holding the end 88 of seal pipe 84 in the end of tubular axle 26. The horizontal portion 91 of the L-shaped bracket 86 is provided with an aperture 93 adjacent its outer end in which the end of hose section 80 is fitted. The shorter vertical length 96 of the L-shaped bracket 86 is formed with an arcuate cutout at its end which straddles around tubular axle 26 and is provided with an aperture in each of its opposite ear portions that align with apertures in the plate portion 38 of axle bracket 34 for receiving a pair of sheet metal screws 100 (FIG. 5). The end 88 of the seal pipe 84 is fastened to the end of hose section 80 by means of a conventional clamping ring 102 (FIGS. 4 and 5).

From the above description, it can be seen that water will flow from the water faucet through pipe 80, through seal pipe 84 into the tubular axle 26 and enters the garden hose 12 through discharge conduit 70, regardless of whether the hose 12 is partially or completely unwound from the drum 14.

A horizontal bracing member 106 (FIG. 1) is secured between the arm portions of handle member 30 to rigidly support the handle member 30 and to provide a mounting surface for holding the free end of hose section 80 by means of a spring clip 108 when the hose reel unit 10 is being transported and stored.

To wind and unwind the hose 12, an L-shaped reel handle, generally designated by the reference numeral 110 (FIG. 5), is mounted through two aligned apertures formed in the end of the axle 26 opposite to the swivel assembly 82. The handle 110 is quickly secured in place by inserting its threaded shaft portion 112, which is at the end opposite to the handle gripping portion 114, through aligned apertures in axle 26 and then tightening a nut 116 onto its threaded end. A washer 113 and protrusion 115 on the handle limit the extent to which the handle may be inserted through the apertures in the axle. A spring washer 117 may be used along with nut 116.

To keep the seal pipe 84 from slipping out of the end of the axle member 26, retainer means in the form of a clip 120 (FIGS. 5 and 7) is locked into diametrically opposite slots formed in the end of axle member 26. Retainer clip 120 consists of an annular member formed of two similar arcuate portions 122 and 124 each having a tooth 123 projecting from the center of their inner surfaces. These teeth fit through slots 125 formed in the end of axle member 26 and extend into a groove 127 formed in the outer surface of the end 88 of swivel member 82. The two portions 122 and 124 of clip 120 are connected together by two sheet metal screws 126 screwed through aligned apertures at the ends of the two portions. The clip 120 can be preassembled by one screw which serves as a hinged connection, thereby making it simple to apply to the shaft 26.

Figure 2:
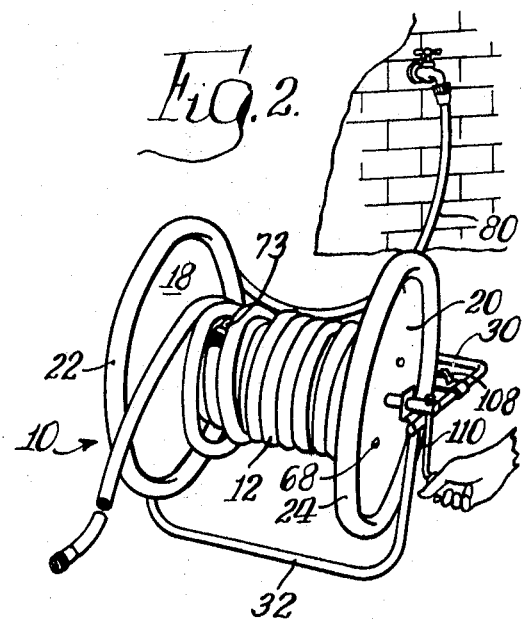
FIG. 2 is a perspective view of a garden hose reel unit embodying the principles of the invention, wherein the unit is illustrated in the position for use in unwinding and winding the hose about the drum.

It should be appreciated that the above described hose reel unit 10 has relatively few components to be put together and that they can be assembled by a relatively unskilled purchaser using a screw driver and a pair of pliers. Also, the hose reel unit 10 is very efficient and convenient to use since it can be easily pushed from a storage area to an area positioned adjacent to a water faucet. There the handle member 30 is tipped downwardly towards the ground to position the unit as shown in FIGS. 2 and 3, and the hose section 80 is fastened to the water faucet. The frame shown in the position of FIGS. 2 and 3 provides a very stable base for the hose reel 10 when the garden hose 12 is being wound or unwound from the reel.

We claim:

1. A transportable hose reel unit comprising a drum having two circular flange members which are secured to its opposite ends and serve as wheels, a hollow tubular axle member operatively associated with said drum with the axle member's axis disposed along the center axis of said drum and extending a short distance beyond each of said flange members, discharge conduit means to provide a fluid passageway between said tubular axle and a garden hose wrapped around said drum, two generally U-shaped members joined together in a spaced apart relationship at their free ends by first and second bracket means, each of said bracket means including an opening slidably fitted over one end of said axle member, a swivel assembly for providing a fluid passageway between said axle member and a hose section which are revolvable relative to each other, said swivel assembly comprising a short length of pipe with one end adapted to be connected to said hose section and the opposite end inserted into one end of said axle member, said opposite end having sealing means disposed between its outer surface and the inner surface of said tubular axle member which sealing means permits relative rotation between said opposite end and said axle member, and a third bracket means removably secured to said first bracket means to hold said short length of pipe in a fixed relationship with said first bracket means.

2. The hose reel unit of claim 1 wherein said first and second bracket means have channels for receiving and maintaining in their spaced apart relationship the outer extremities of the U-shaped members.

3. The hose reel unit of claim 2 wherein U-shaped members comprise a handle and a rest portion spaced apart approximately 90°.

4. The hose reel unit of claim 2 wherein the sealing means comprises at least one O-ring seated in an annular groove in the exterior of said opposite end of said short length of pipe.

5. The hose reel unit of claim 1 further including an axle turning assembly comprising a generally L-shaped structure with one leg secured to the end of said axle member opposite from said swivel assembly and the other leg disposed parallel to said axle member and extending in a direction away from said drum and having a hand gripping portion.

6. The hose reel unit of claim 1, wherein each of said circular flange members has a rubber tire portion disposed around its outer periphery to assist in transporting the hose reel unit.

7. The hose reel unit as defined in claim 1, wherein said third bracket means comprises an L-shaped structure with one leg having an aperture adapted to fit closely about a hose section when the latter is fitted over said one end of said short length of pipe, and the other leg secured to said first bracket means to hold said short length of pipe in a fixed relationship with said first bracket means.

8. The hose reel unit as defined in claim 1, further comprising a removable retainer means fastened on said one end of said axle member to act as a stop limit for said first bracket means and to retain said short length of pipe in said axle.

9. The hose reel unit of claim 8 wherein the retainer means fits through spaced slots in the axle and into a groove in said short length of pipe.